(No Model.)
J. HATCH & J. H. GEORGE.
CASTER.
No. 395,136. Patented Dec. 25, 1888.
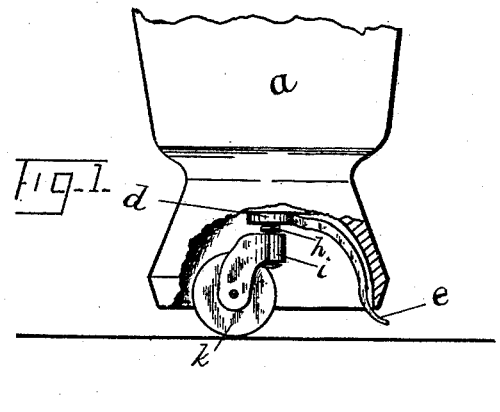
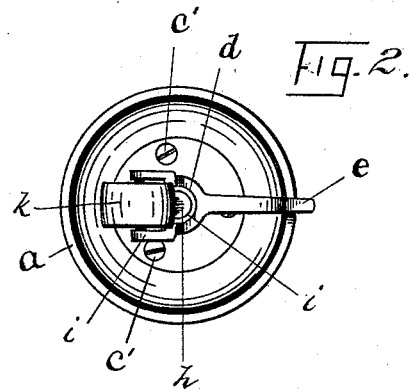
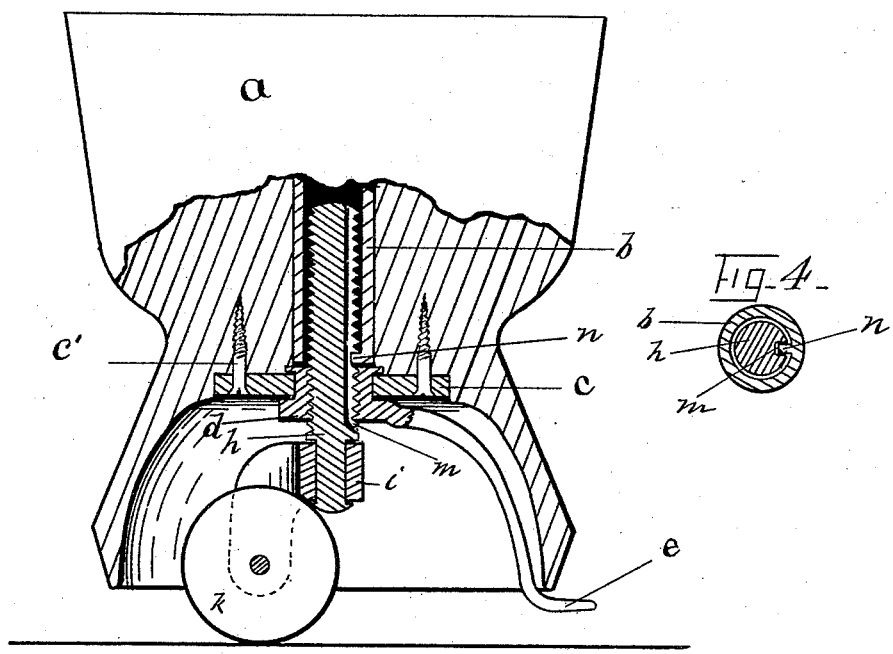
Witnesses
Allen Tenney
Henry H. Burnham.
Inventors
Jonathan Hatch,
J. Herbert George.
By their Attorney
Frank H. Allen

UNITED STATES PATENT OFFICE.

JONATHAN HATCH, OF SOUTH WINDHAM, AND JAMES HERBERT GEORGE, OF NORWICH, CONNECTICUT.

CASTER.

SPECIFICATION forming part of Letters Patent No. 395,136, dated December 25, 1888.

Application filed May 16, 1888. Serial No. 274,098. (No model.)

*To all whom it may concern:*

Be it known that we, JONATHAN HATCH, of South Windham, Windham county, Connecticut, and JAMES HERBERT GEORGE, of Norwich, New London county, Connecticut, both citizens of the United States, have invented certain new and useful Improvements in Casters, which improvements are fully set forth and described in the following specification, reference being had to the accompanying sheet of drawings, in which—

Figure 1 is an elevation of a portion of a piano-leg having a caster of our new form attached thereto, said leg being partially cut away to expose said caster. Fig. 2 is a bottom end view of a similar leg and caster. Fig. 3 is an enlarged central vertical section of a piano-leg and its attached caster, and illustrates the construction and relative positions of the several elementary parts of the same. Fig. 4 is a cross-section of the threaded pintle $h$ and its inclosing-shell $b$.

This invention is in furniture-casters, and has for its immediate object the production of a simple device by means of which the wheel of a caster may be readily adjusted vertically, and which will require no special tools to operate it.

Casters of our improved construction are applicable to various classes of furniture, but are especially adapted for use on piano-legs, and we have therefore shown said invention as so applied.

Referring to the drawings, the letter $a$ indicates a portion of a piano-leg, the same being preferably cupped at its lower end to receive and partially hide the caster. Said leg is bored centrally from its lower end upward to receive a tubular shell, $b$, which is forced tightly into place.

$c$ denotes a centrally-perforated disk, concentric with the shell $b$ and securely fastened to the leg $a$ by screws $c'$.

$d$ indicates a threaded nut which projects upward through the disk $c$, and is interlocked with said disk by bending over the inner end of the nut, or by any other method that will prevent the removal of said nut. This nut $d$ may be freely rotated within disk $c$, and is provided with an operating-handle, $e$, that projects downward and radially from said nut and by means of which the nut may be rotated without lifting the leg $a$ or otherwise disturbing the article of furniture to which it is attached. Screwed into nut $d$ is the caster-pintle $h$, whose lower end is shouldered and headed to receive and retain the swivel caster-head $i$, that carries the roller $k$. This threaded pintle $h$ is slotted longitudinally, as at $m$, to receive a lug, $n$, formed on the shell $b$, the office of said lug and slot being to prevent the rotation of the pintle $h$.

Assuming that we have a caster constructed and assembled as above described, it will be understood that by rotating the nut $d$ the pintle $h$ will travel slowly upward or downward through said nut, and the attached caster-roller $k$ will be correspondingly elevated or lowered. The handle $e$, projecting outward from the lower end of the leg, provides a convenient and powerful means for rotating the said nut and dispenses with the necessity of using a wrench or other tool.

Having described our invention, we claim—

In a furniture-caster, the combination, with a shell or socket and a disk, of an internally-threaded nut independent of said socket adapted to be rotated in said disk, and having a laterally-projecting operating-arm, and a threaded non-rotatable pintle adapted to be screwed into said nut, substantially as and for the purpose specified.

JONATHAN HATCH.
J. HERBERT GEORGE.

Witnesses:
FRANK H. ALLEN,
F. L. ALLEN.